(12) United States Patent
Panec et al.

(10) Patent No.: US 9,609,969 B1
(45) Date of Patent: *Apr. 4, 2017

(54) DEFORMABLE ELASTOMERIC VALVE AND VALVE ASSEMBLY

(71) Applicant: Acorn Bay, Novato, CA (US)

(72) Inventors: Donald J. Panec, Novato, CA (US); Kathryn Kelsey Anne Stillinger, Novato, CA (US); Scott H. Stillinger, Novato, CA (US)

(73) Assignee: ACORN BAY, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,861

(22) Filed: Jul. 23, 2015

Related U.S. Application Data

(60) Provisional application No. 62/028,195, filed on Jul. 23, 2014.

(51) Int. Cl.
*A47G 21/18* (2006.01)
*F16K 21/04* (2006.01)
(Continued)

(52) U.S. Cl.
CPC ............. *A47G 21/185* (2013.01); *F16K 7/12* (2013.01); *F16K 21/04* (2013.01); *A45F 3/16* (2013.01); *B65D 47/2031* (2013.01)

(58) Field of Classification Search
CPC .. A47G 21/185; A47G 21/18; A47G 19/2266; F16K 31/58; F16K 7/12; F16K 21/04; E21B 34/12; B65D 47/2031; B65D 47/2018; A45F 3/16; A45F 21/185; A45F 3/20

USPC ........ 251/341, 342, 356, 358; 222/213, 491, 222/494, 490, 498; 220/705, 714, 716, 220/717
See application file for complete search history.

(56) References Cited

U.S. PATENT DOCUMENTS

| 274,447 | A | * | 3/1883 | Kennish | .................. | A47J 31/06 |
| | | | | | | 137/846 |
| 2,755,060 | A | * | 7/1956 | Twyman | .................. | F16K 7/00 |
| | | | | | | 137/847 |

(Continued)

OTHER PUBLICATIONS

Aptargroup Inc., "VersaSpout", website, retrieved May 20, 2015, http://www.aptar.com/food-beverage/beverage/application-fields?cat=dairy&id=versaspout.

(Continued)

*Primary Examiner* — Mary McManmon
*Assistant Examiner* — David Colon Morales
(74) *Attorney, Agent, or Firm* — Michael J. Andri

(57) ABSTRACT

An elastomeric valve includes a barrel having one or more walls defining an interior fluid pathway. The barrel is deformable between a non-deformed state and a deformed state. The elastomeric valve further includes a gate assembly of two or more gate elements forming a tapering volume projecting into the fluid pathway from the one or more walls of the barrel. In at least some examples, each gate element joins the barrel at a reduced cross-section that forms a hinge of that gate element. The two or more gate elements interface with each other along one or more gate boundaries to collectively block the fluid pathway in the non-deformed state and separate from each other along the one or more gate boundaries in the deformed state to permit fluid flow through the gate assembly.

18 Claims, 11 Drawing Sheets

(51) Int. Cl.
*F16K 7/12* (2006.01)
*A45F 3/16* (2006.01)
*B65D 47/20* (2006.01)

(56) References Cited

U.S. PATENT DOCUMENTS

| | | | |
|---|---|---|---|
| 3,067,787 A | 12/1962 | Salk | |
| 3,349,972 A * | 10/1967 | Whiteford | B65D 47/2031 222/212 |
| 4,828,141 A | 5/1989 | Coy | |
| 4,946,062 A * | 8/1990 | Coy | B65D 17/502 215/11.4 |
| 4,968,294 A * | 11/1990 | Salama | A61F 2/0009 128/DIG. 25 |
| 5,085,349 A * | 2/1992 | Fawcett | A45F 3/20 220/703 |
| 5,101,991 A * | 4/1992 | Morifuji | A61J 11/002 215/11.1 |
| 5,601,207 A * | 2/1997 | Paczonay | A47G 21/185 215/11.4 |
| 5,730,336 A * | 3/1998 | Lerner | A45F 3/16 137/849 |
| 5,743,443 A | 4/1998 | Hins | |
| 5,791,510 A | 8/1998 | Paczonay | |
| 5,800,339 A * | 9/1998 | Salama | A61F 2/0009 128/DIG. 25 |
| 5,806,726 A * | 9/1998 | Ho | B62J 11/00 222/107 |
| 5,816,457 A * | 10/1998 | Croft | A45F 3/04 224/148.2 |
| 6,032,831 A * | 3/2000 | Gardner | A45F 3/16 220/703 |
| 6,062,435 A * | 5/2000 | Hess, III | B65D 75/5883 222/175 |
| 6,135,311 A | 10/2000 | Panec et al. | |
| 6,273,128 B1 * | 8/2001 | Paczonay | F16K 15/147 137/512.3 |
| 6,273,307 B1 | 8/2001 | Gross et al. | |
| 6,279,772 B1 * | 8/2001 | Bowman | B65D 47/2031 220/703 |
| 6,557,721 B2 * | 5/2003 | Yang | A47G 21/185 220/713 |
| 6,598,757 B2 | 7/2003 | Stillinger et al. | |
| 6,629,624 B2 | 10/2003 | Stillinger et al. | |
| 6,874,760 B2 * | 4/2005 | Steckel | F16K 15/147 222/175 |
| 6,994,225 B2 * | 2/2006 | Hakim | A61J 11/0015 215/11.1 |
| 7,077,296 B2 | 7/2006 | Brown et al. | |
| 7,267,245 B2 * | 9/2007 | Yang | F16K 15/147 220/703 |
| 7,533,783 B2 * | 5/2009 | Choi | B65D 47/065 220/705 |
| 7,837,056 B2 | 11/2010 | Stribling et al. | |
| 7,934,620 B2 | 5/2011 | Stribling et al. | |
| 8,152,138 B2 | 4/2012 | Skillern | |
| 8,328,113 B2 * | 12/2012 | Stribling | A47G 21/185 215/388 |
| 8,701,928 B2 | 4/2014 | Samson | |
| 8,833,598 B2 | 9/2014 | Hammi | |
| 2002/0011583 A1 | 1/2002 | Getzewich et al. | |
| 2002/0092858 A1 * | 7/2002 | Bowman | A45F 3/16 220/709 |
| 2002/0092877 A1 * | 7/2002 | Bowman | A45F 3/18 222/490 |
| 2003/0222238 A1 | 12/2003 | Getzewich et al. | |
| 2005/0242204 A1 * | 11/2005 | Ness | A47G 21/185 239/24 |
| 2009/0196675 A1 * | 8/2009 | May | B29C 45/0081 401/206 |
| 2011/0056992 A1 * | 3/2011 | Harward | A45F 3/20 222/209 |
| 2012/0168450 A1 * | 7/2012 | Samson | A47G 19/2272 220/703 |

OTHER PUBLICATIONS backcountrygear.com, "Platypus HyperFlow Cap", website, retrieved Aug. 3, 2015, http://www.backcountrygear.com/platypus-hyperflow-cap.html.

Cascade Designs, Inc., "HyperFlow Bite Valve", website, retrieved before Jul. 23, 2015, http://www.cascadedesigns.com/platypus/platy-accessories/hydration-system-accessories/hyperflow-bite-valve/product.

Camelbak Products, LLC, "eddy and Groove Bite Valve 2-Pack", Apr. 4, 2015, website, http://shop.camelbak.com/eddy-and-groove-bite-valve-2pack/d/1152__c__322__cl__1086.

Choomee Inc., "Sip'n", website, Jul. 20, 2015, http://www.choomee.com/sipn/.

The Last Straw, "The Straw", website, Feb. 21, 2015, http://www.thelaststrawllc.com/thestraw__how.html.

Moontrail, "Platypus Platy Soft Bottle 1L", website, retrieved Aug. 3, 2015, http://www.moontrail.com/platypus-platy-soft-bottle-1l.php.

USPTO, "Office Action", Office correspondence and search information in co-pending U.S. Appl. No. 14/955,054, Aug. 11, 2016, 41 pages.

* cited by examiner

US 9,609,969 B1

DEFORMABLE ELASTOMERIC VALVE AND VALVE ASSEMBLY

CROSS-REFERENCE TO RELATED APPLICATION

The present application claims priority to and the benefit of U.S. provisional patent application Ser. No. 62/028,195, titled NON SPILL VALVE, filed Jul. 23, 2014, the entire contents of which are incorporated herein by reference in their entirety for all purposes.

BACKGROUND

Valves may be used to reduce spillage of fluids from containers or to limit fluid flow along a conduit. Bite valves, for example, enable a user to use a biting action of the user's mouth to open a fluid pathway at the valve and permit fluid flow from a bottle or hydration tube. Bite valves typically incorporate a flexible valve material that deforms in response to a biting force to open the valve.

SUMMARY

An elastomeric bite valve includes a barrel having one or more walls that define a fluid pathway, and a gate assembly that projects into the fluid pathway from the wall(s) of the barrel. The gate assembly includes gate elements that interface with each other along one or more gate boundaries to collectively block the fluid pathway in a non-deformed state of the valve. In some examples, each gate element joins a wall of the barrel at a reduced cross-section material that forms a hinge of that gate element. The gate elements separate from each other along the gate boundaries upon deformation of the valve to permit fluid flow through the gate assembly.

The elastomeric bite valve may form part of a valve assembly that further includes a fitment that defines another fluid pathway that joins the fluid pathway of the valve to a container or to a fluid conduit. The fitment may be formed from a material having greater rigidity than the elastomeric bite valve. The fitment may include a sleeve having exterior threads that accommodate corresponding interior threads of an interior region of a cap. The interior region of the cap accommodates and surrounds the elastomeric bite valve when the interior threads of the cap are threaded onto the exterior threads of the sleeve.

This summary describes only some of the concepts presented in detail by the following detailed description. As such, claimed subject matter is not limited by the contents of this summary.

DETAILED DESCRIPTION

In aspect of the present disclosure, the responsiveness and/or ease of opening of deformable elastomeric valves, including bite actuated valves (i.e., bite valves), may be improved by increasing a depth of the valve's gate elements along an axis of the valve. This increased depth of the gate elements serves to increase a lateral translation of the gate elements relative to the axis, thereby increasing a size of a flow opening formed between the gate elements for a given actuation force applied to the valve. In an additional or alternative aspect of the present disclosure, the responsiveness and/or ease of opening of deformable elastomeric valves, including bite valves, may be improved by inclusion of hinges formed by a reduced cross-section of material at an interface of the valve's gate elements and a barrel of the valve. Deformation of the valve caused by an applied actuation force is focused at the hinges, which increases rotation of the gate elements about the hinges. This increased rotation serves to increase a size of a flow opening formed between the gate elements for a given actuation force applied to the valve.

Figure 1:
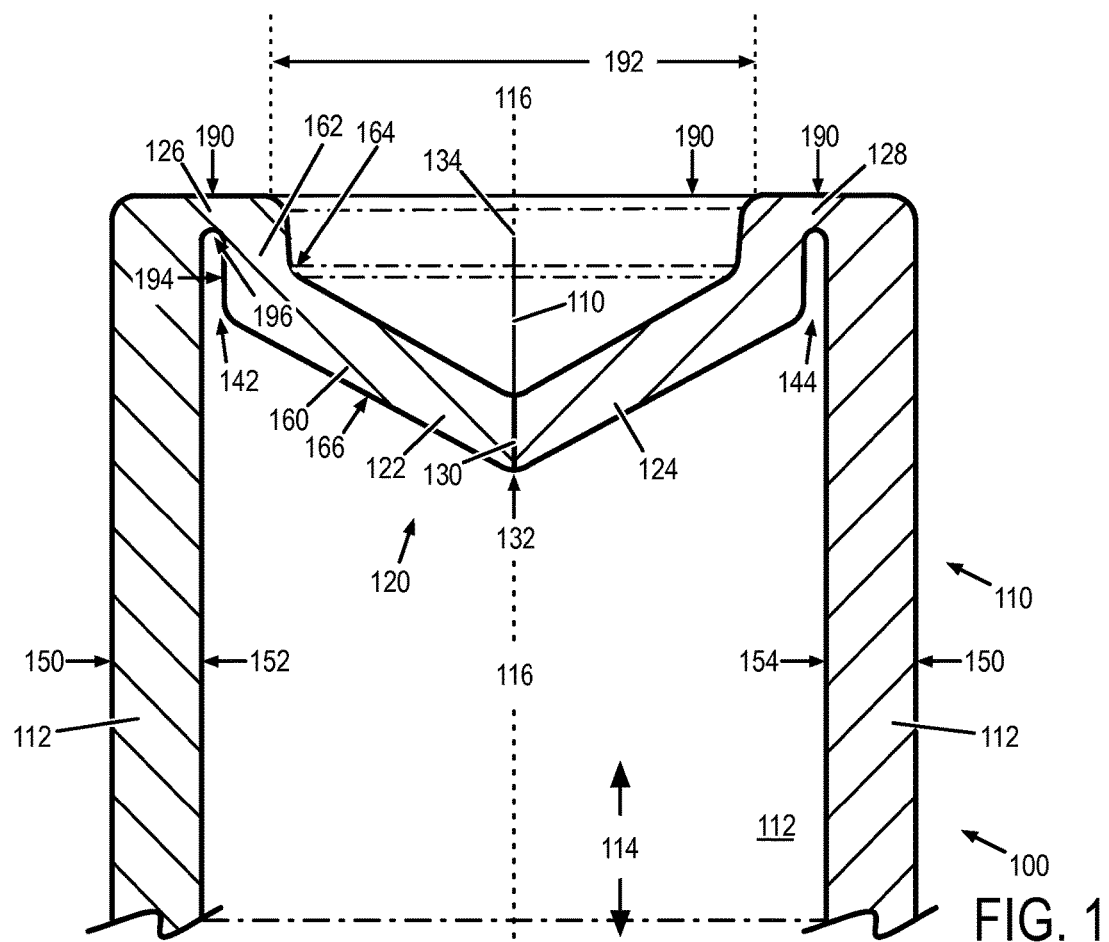
FIG. 1 depicts an internal view of an example valve in a first state.

FIG. 1 depicts an internal view of an example valve 100 as viewed within a plane that bisects the valve. Valve 100 may take the form of an elastomeric valve that is deformable between a first state depicted in FIG. 1 and a second state (i.e., a deformed state). Valve 100 may additionally or alternatively take the form of a bite valve that enables a user to use a biting action of the user's mouth to open the valve. In combination, valve 100 may take the form of a deformable elastomeric bite valve.

Figure 3:
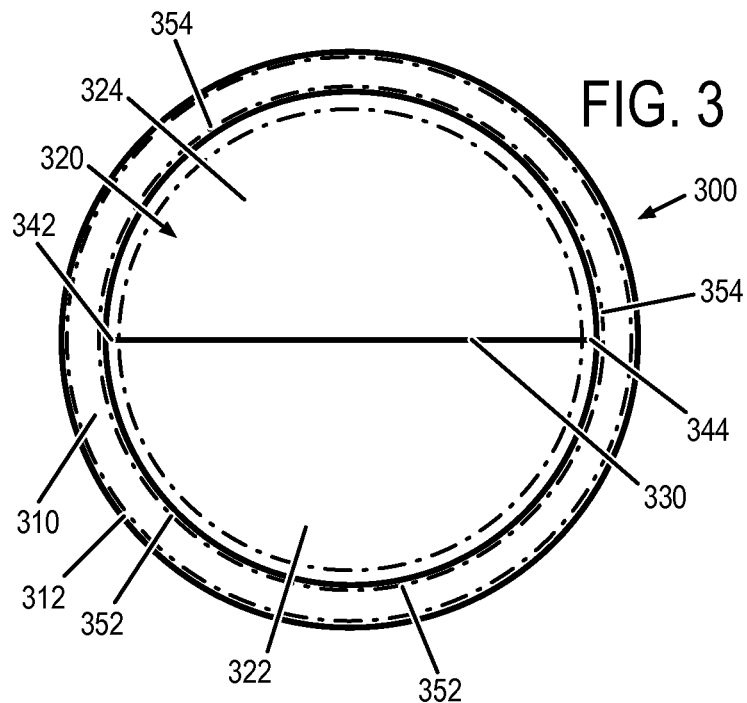
FIG. 3 depicts an external view of an example valve in a first state as viewed along an axis of the fluid pathway of the valve.
Figure 4:
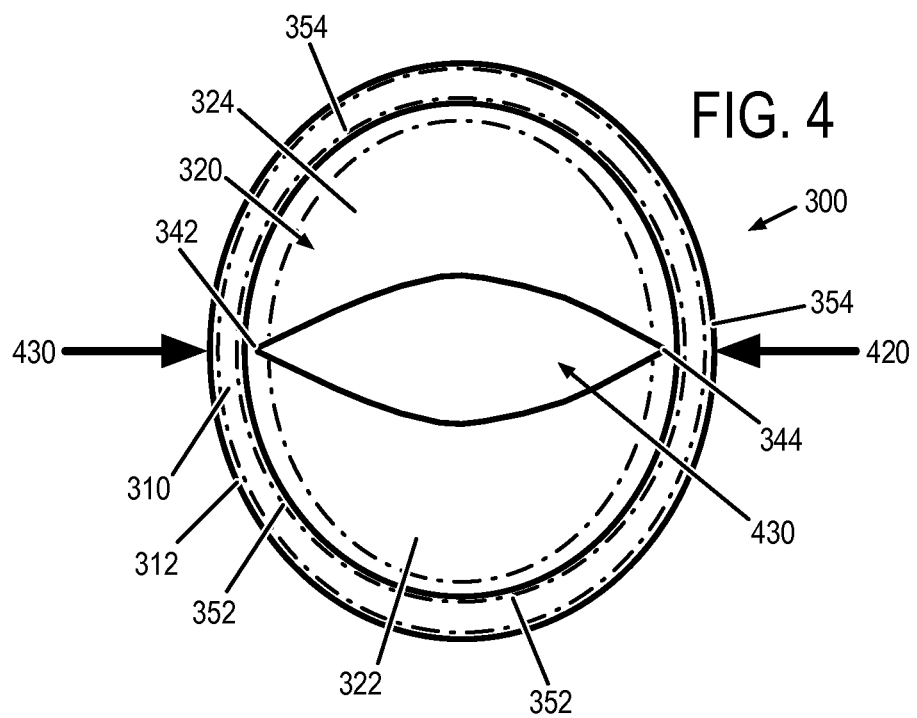
FIG. 4 depicts an external view of the example valve of FIG. 3 in a second state as viewed along the axis of the fluid pathway of the valve.

Valve 100 includes a barrel 110 having one or more walls defining an interior fluid pathway 114. In at least some examples, barrel 110 may take the form of a three-dimensional volume that is wrapped around an axis 116 of fluid pathway 114. Axis 116 is located within the same viewing plane of FIG. 1 that bisects the valve. Within this context, valve 100 may be symmetric (with the exception of gate boundaries) about axis 116 in any plane that bisects the valve. As an example, barrel 110 may have a circular shape (e.g., may form an annulus) that is defined by an individual, continuous wall (e.g., wall 112), as viewed along axis 116 of fluid pathway 114. As another example, barrel 110 may have a non-circular shape that is defined by an individual wall (e.g., in the case of a non-circular ellipse or other non-segmented shape) or by two or more walls (e.g., in the case of a non-circular polygon shape or a combination polygon/non-segmented shape), as viewed along axis 116 of fluid pathway 114. At least some of these shapes may be symmetric about axis 116 in at least one plane that bisects the valve. Views of example valve barrels are depicted in FIGS. 3, 4, and 8.

Valve 100 further includes a gate assembly 120 that projects into fluid pathway 114 from the one or more walls (e.g., wall 112) of barrel 110. Gate assembly 120 is formed by two or more gate elements (e.g., gate elements 122, 124) that interface with each other along one or more gate boundaries (e.g., gate boundary 130) to collectively block fluid pathway 114, at least within the first state of valve 100 depicted in FIG. 1. This first state may correspond to a non-deformed state of barrel 110 and/or valve 100 generally, and may be referred to as a closed state of gate assembly 120. Barrel 110 and/or valve 100 may be deformed from the non-deformed state to the deformed state upon application of one or more external forces to the barrel or valve generally. Within the context of an elastomeric valve, deformation is in the form of elastic deformation, which enables the valve to return to the first state upon removal of the one or more external forces.

Figure 2A:
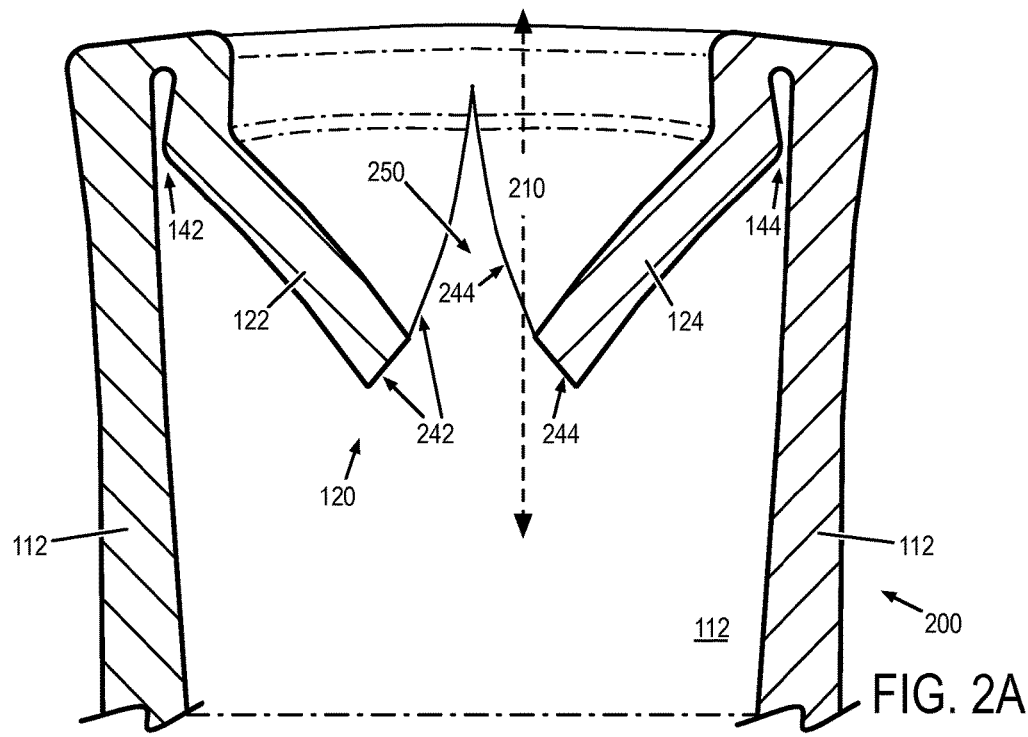
FIG. 2A depicts an internal view of the example valve of FIG. 1 in a second state.

FIG. 2A depicts an internal view of valve 100 in a second state, within the same plane of FIG. 1 that bisects the valve. In FIG. 2A, gate elements (e.g., gate elements 122, 124) are separated from each other along the one or more gate boundaries (e.g., gate boundary 130) to permit fluid flow through or across gate assembly 120, as indicated at 210. This second state may correspond to a deformed state of barrel 110 and/or of valve 100 generally, and may be referred to as an open state of gate assembly 120. As previously discussed, deformation of barrel 110 and/or valve 100 may be in response to one or more external forces applied to barrel 110 and/or to valve 100 generally.

Figure 2B:
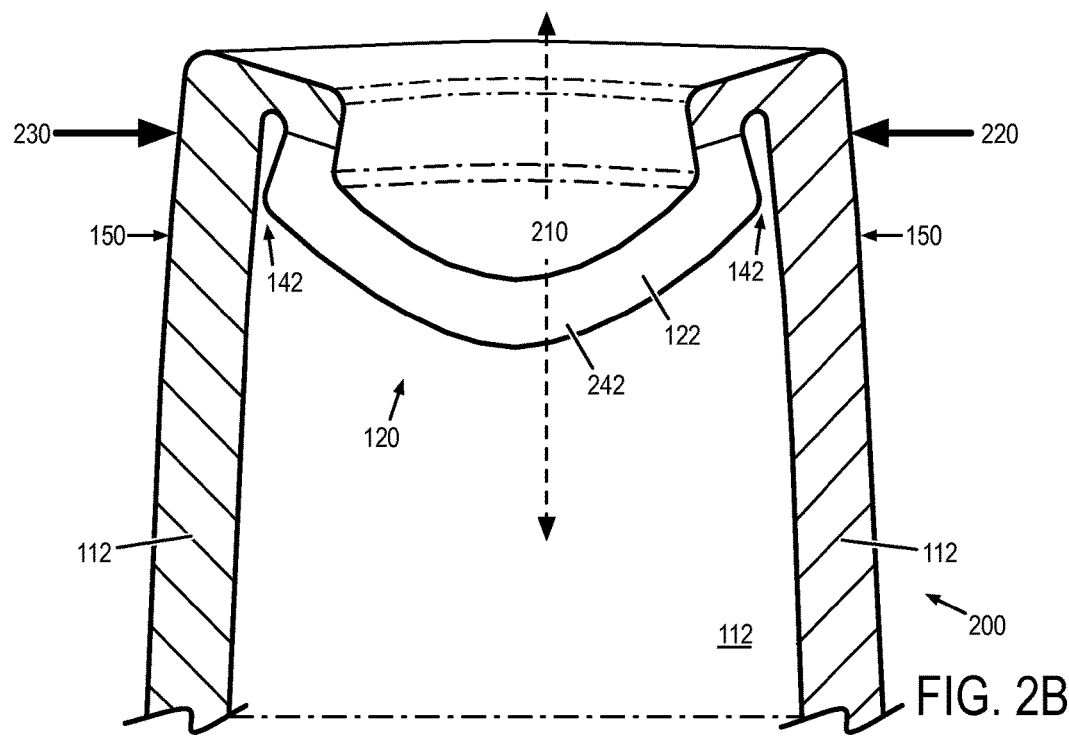
FIG. 2B depicts another internal view of the example valve of FIG. 1 in the second state.

FIG. 2B depicts another internal view of valve 100 in the second state. The internal view depicted in FIG. 2B is within an orthogonal plane to the plane depicted in FIGS. 1 and 2A. Within the example depicted in FIG. 2B, external forces 220 and/or 230 are applied to exterior surfaces 150 of barrel 110, which results in deformation of the barrel and/or other portions of the valve (e.g., the gate assembly and/or gate elements). External forces 220 and/or 230 depicted in FIG. 2B cause the two or more gate elements to separate from each other and permit fluid flow through or across gate assembly 120 as again indicated at 210. Upon removal of the external force(s) from barrel 110 and/or valve 100 generally, the valve may return to the first state depicted in FIG. 1 in which the gate elements collectively block fluid pathway 114. While FIG. 2C depicts external forces 220, 230 being applied to the barrel of the valve to open the gate assembly, in other use-scenarios, the valve may be actuated by applying one or more external forces to the rim of the valve, the gate assembly, or other locations of the barrel, including forces that include vector components in the downward direction and/or lateral directions as viewed in FIG. 2C.

In at least some examples, each gate element of the two or more gate elements of gate assembly 120 join barrel 110 at a reduced cross-section of elastomeric material that forms a hinge of that gate element. For example, gate element 122 joins barrel 110 at a reduced cross-section that forms a hinge 126 of gate element 122, and gate element 124 joins barrel 110 at a reduced cross-section that forms a hinge 128 of gate element 124. Each gate element of gate assembly 120 may rotate and/or deform about its respective hinge responsive to application of an external force to barrel 110 or valve 100 generally, such as example forces 220, 230. Hinges may be included with a valve to reduce the force required to open the gate elements of the gate assembly. Within these examples, a reduced cross-section refers to a narrowing of material relative to neighboring barrel and/or gate assembly portions of the valve. Typically, this reduced cross-section is the thinnest wall of the valve in the vicinity of an interface between the gate assembly and the walls of the barrel.

A hinge may include a reduced cross-section of material that forms a relatively narrow hinge region (e.g. a line when viewed in section) or a relatively wide hinge region (e.g., a rectilinear shape when viewed in section). For example, FIG. 1 depicts an example of a relatively narrow hinge region for hinge 126 that is defined by interior surface 196 having a curved shape. If interior surface 196 were parallel to an external surface of the valve formed by a rim 190 or other external surface of the valve, then hinge 126 would form a relatively wide hinge region.

Figure 7A:
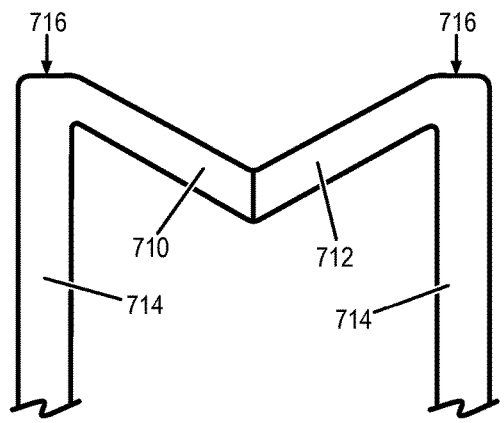
FIGS. 7A-7G depict additional examples of valves in simplified form as viewed in a plane that bisects each valve.

In at least some examples, a valve may not include hinges or reduced cross-sections that define an interface between the gate assembly and barrel. FIG. 7A depicts an example of a valve that does not include hinges.

Valve 100 includes a rim 190 that forms a terminating end of the valve. The rim of the valve refers to the most distal end of the valve as measured along a direction of the valve axis (e.g., axis 116 in FIG. 1). The rim of a valve may be formed by the barrel walls, the gate assembly, or a combination thereof. For example, rim 190 is formed by a combination of the barrel walls and the gate assembly, and spans the hinges of the gate elements. In a non-deformed state, a rim may have a circular shape (e.g., forming an annulus), oval shape (e.g., forming an oblong ring), polygonal shape, or irregular shape as viewed along an axis of the fluid pathway. A rim may be continuous (e.g., surround the entire through region and gate assembly of the valve) or may be non-continuous (e.g., surround or be located along) only a portion of the throat region and gate assembly. FIGS. 3 and 8 depict example rims as viewed along the fluid pathway. In certain contexts, a rim or rim portion (e.g., in the case of non-continuous rims) when protruding from another surface of the valve may be referred to as a rib. For example, the structure residing beneath rim 770 in FIG. 7E in combination with rim 770 may be referred to collectively as a rib. Similarly, with reference to FIG. 8D, rim portions 864 and 866 may each form part of a rib in combination with the structure residing beneath rim portions 864 and 866.

FIGS. 1, 2A and 2B, depict hinges 126 and 128 being located beneath rim 190, as measured along axis 116. In this example, one of the opposing surfaces that forms the reduced cross-section of material defining each hinge also forms part of the rim. For example, in FIG. 1, hinge 126 is formed by a portion of rim 190. In other examples, hinges may be located outside of (e.g., as viewed along the axis of the valve) a rim formed by the gate assembly, or hinges may be located within an interior region (e.g., as viewed along the axis of the valve) of a rim formed by the barrel. In these examples, the hinge may not be formed by a portion of the rim.

Referring again to FIG. 1, gate assembly 120 may form a tapering volume, in at least a closed state of gate assembly 120, that projects into fluid pathway 114 from the one or more walls of barrel 110. In the example depicted in FIG. 1, gate assembly 120 tapers to or toward a distal end 132 of gate assembly 120 from the one or more walls of barrel 110. Also in this example, the gate assembly projects and tapers into the barrel, and away from a terminating end of the valve formed by rim 190. This configuration may be referred to as a concave gate assembly, because the gate assembly has a concave configuration at a terminating end of the barrel. A concave gate assembly, such as gate assembly 120, includes a throat region 192 located within an interior of rim 190.

Within the context of an annular rim or other closed shaped rim, throat region 192 forms a two-dimensional area through which fluid exits the valve.

A concave gate assembly provides increased closing force between gate elements in response to a higher internal fluid pressure within fluid pathway 114 relative to an external fluid pressure on an opposite side of the gate assembly. A concave gate assembly, such as example gate assembly 120, may be located entirely within and surrounded by the walls of the barrel such that the gate assembly does not project outward in a direction of axis 116 beyond the walls of the barrel. In this example, the rim is formed, at least in part, by the barrel and may additionally be formed by a portion of the gate assembly (e.g., segment 162 of gate element 122). In other examples, a portion of a concave gate assembly may project beyond the walls of the barrel as measured along axis 116, and may form the rim of the valve.

In other examples, the gate assembly may project and/or taper in an opposite direction from the example depicted in FIG. 1, and in a direction of the terminating end of the valve depicted in FIG. 1. This configuration may be referred to as a convex gate assembly, because the gate assembly forms a convex terminating end of the valve. A convex gate assembly may not include a throat region in at least some examples. A convex gate assembly may be located entirely or partially outside of the barrel, as measured along axis 116. A convex gate assembly provides reduced closing force between gate elements in response to a higher fluid pressure within fluid pathway 114 relative to an opposite side of the gate assembly. A convex gate assembly may be used to reduce counter-flow of fluid into fluid pathway 114 from the opposite side of the gate assembly from the fluid pathway. In still further examples, the gate assembly may form a planar surface that projects into the fluid pathway from the one or more walls of the barrel, but does not project or taper in either direction along axis 116 of fluid pathway 114. A gate assembly that forms a planar surface may provide a pressure neutral implementation of the valve.

In at least some examples, rotation of the two or more gate elements may be accommodated by a clearance region that separates each gate element from an interior surface of the one or more walls of the barrel. For example, an interior surface 194 of gate element 122 is spaced apart from interior surface 152 of wall 112 by clearance region 142, and an interior surface of gate element 124 is spaced apart from interior surface 154 of wall 112 by clearance region 144. FIGS. 2A and 2B depict an example of gate element 122 rotating and/or deforming into clearance region 142, and an example of gate element 124 rotating and/or deforming into clearance region 144.

A terminating end of each clearance region may include an interior surface that, in combination with an opposing exterior surface of the valve, forms a reduced cross-section of material that defines a hinge. For example, clearance region 142 terminates at an interior surface 196 that opposes an exterior surface (e.g., of rim 190). Here, interior surface 196 and rim 190 collectively define hinge 126. Similarly, clearance region 144 terminates at an interior surface that opposes a surface of rim 190, which collectively define hinge 128. An interior surface of a terminating end of a clearance region may include a curved or flat surface, depending on implementation.

In some examples, a clearance region may be defined by parallel opposing interior surfaces of the barrel and a gate element. For example, interior surface 152 of wall of 112 may be parallel to interior surface 194 of gate element 122, and interior surface 154 of wall 112 may be parallel to an opposing interior surface of gate assembly 124. FIG. 1 depicts interior surfaces 194 and 152 as planar surfaces. In other examples, interior opposing surfaces of the barrel and gate elements may not be parallel to each other and/or may be curved surfaces. For example, interior surface 152 of wall 112 may be parallel to axis 116, but interior surface 194 of gate element 122 may be inclined or curved relative to axis 116.

A gate element may be formed by one, two, or more segments. As an example, each gate element of valve 100 is formed by two segments. For example, gate element 122 is formed by a first segment 160 and a second segment 162 that join each other at a transition 164. First segment 160 is inclined relative to axis 116 of the fluid pathway by a greater amount (e.g., a greater angle) than second segment 162 during at least the non-deformed state of the valve or closed state of the gate assembly depicted in FIG. 1. In the first state of valve 100 depicted in FIG. 1, segments 160, 162 each have planar or substantially planar surfaces along at least a portion of their length. For example, reference numeral 166 in FIG. 1 points generally to an interior planar surface of first segment 160. Individual segments may be distinguished from each other on the basis of planar versus non-planar surfaces, such as two planar surfaces separated by a transition or a planar surface that transitions into another surface that curves over its length. In other examples, a gate element may include a single segment. For example, a gate element may include a single planar or curved surface along its length. Gate element 124 is symmetric to gate element 122 about axis 116 in this example.

In at least some examples, the one or more gate boundaries (e.g., gate boundary 130) may extend radially outward from an apex (e.g., distal end 132) of gate assembly 120 toward, up to, or beyond the hinges (e.g., hinges 126, 128) of the two or more gate elements, terminating at respective end points (e.g., end point 134). In the example depicted in FIG. 1, gate boundary 130 terminates before reaching hinges 126, 128. In other examples, one or more gate boundaries may extend up to or extend beyond the reduced cross-section that defines the one or more hinges. In at least some examples, the one or more gate boundaries (e.g., gate boundary 130) may extend radially outward from an apex of the gate assembly up to or beyond a transition between first and second segments of each gate element. In the example depicted in FIG. 1, gate boundary 130 extends beyond transition 164 between planar surfaces of first segment 160 and second segment 162. In other examples, one or more gate boundaries may extend up to or may terminate before reaching the transition between first and second segments.

FIG. 2A further depicts example interface surfaces of gate elements 122, 124 that interface with each other in a closed state of the gate assembly. For example, interface surface 242 of gate element 122 interfaces with interface surface 244 of gate element 124 along gate boundary 130 in the closed state. Interface surfaces 242 and 244 define a gate opening region 250 through which fluid may flow. It will be understood that a size of gate opening region 250 may be dependent upon a magnitude of the one or more external forces applied to the valve, a direction of the one or more external forces, and a location upon the valve where each of the one or more external forces are applied.

FIG. 2B further depicts gate element 122, interface surface 242, and clearance region 142 from a different perspective than FIG. 2A. The deformation of valve 100 depicted in FIG. 2B includes inward squeezing of the valve resulting from application of external forces 220 and 230. By contrast, the deformation of valve 100 depicted in FIG. 2A resulting from application of external forces 220 and 230 includes an outward expansion of the valve in an orthogonal plane to FIG. 2B, which causes gate elements 122, 124 to separate from each other.

In an example, valve 100 is formed from a single or unitary piece of material. The material may include or consist of a thermoplastic elastomer (TPE), silicon rubber, or other suitable elastomer or combination of elastomers. An elastomeric valve, such as valve 100 or the various other elastomeric valves disclosed herein, may be cast using a molding process (e.g., injection molded). In other examples, a valve may be printed using three-dimensional printing techniques. The various gate boundaries disclosed herein may be created by slicing or otherwise cutting the gate assembly to a desired width and/or depth to obtain the desired quantity, size, and configuration of gate elements.

FIG. 3 depicts an external view of an example valve 300, as viewed along an axis of the fluid pathway of the valve. Valve 300 of FIG. 3 is a non-limiting example of previously described valve 100 in the first state, depicted in FIG. 1. Valve 300 includes a barrel 310 having a wall 312 that defines a circular shape. Valve 300 further includes a gate assembly 320 having a circular shape formed by two gate elements 322, 324 that interface with each other along a gate boundary 330 to collectively block a fluid pathway defined by barrel 310. Also in this example, gate element 322 joins barrel 310 at a reduced cross-section that forms a hinge 352 of gate element 322, and gate element 324 joins barrel 310 at a reduced cross-section that forms a hinge 354 of gate element 324. The reduced cross-section of valve 300 has a circular shape in which hinge 352 forms a first half-circle and hinge 354 forms a second half-circle of the reduced cross-section. Gate element 322, 324 may rotate about their respective hinges 352, 354 responsive to application of an external force to barrel 310 or valve 300 generally. Also in this example, gate boundary 330 bisects gate assembly 320, and terminates at first and second end points 342, 344 prior to reaching the reduced cross-section that defines hinge 352, 354.

FIG. 4 depicts an external view of valve 300 of FIG. 3 as again viewed along an axis of the fluid pathway of the valve. In FIG. 4, valve 300 is in a second state in which gate elements 322 and 324 are separated from each other to form a gate opening region 430. Valve 300 of FIG. 4 is a non-limiting example of previously described valve 100 in the second state, as depicted in FIGS. 2A and 2B. Gate opening region 430 is an example of previously described gate opening region 250 of FIG. 2A. In this example, external forces 420 and/or 430 are applied to the barrel, which results in the deformation of the barrel and the separating of gate elements 322 and 324. External force 420 may correspond to external force 220, and external force 430 may correspond to external force 230 in FIG. 2B.

Figure 5:
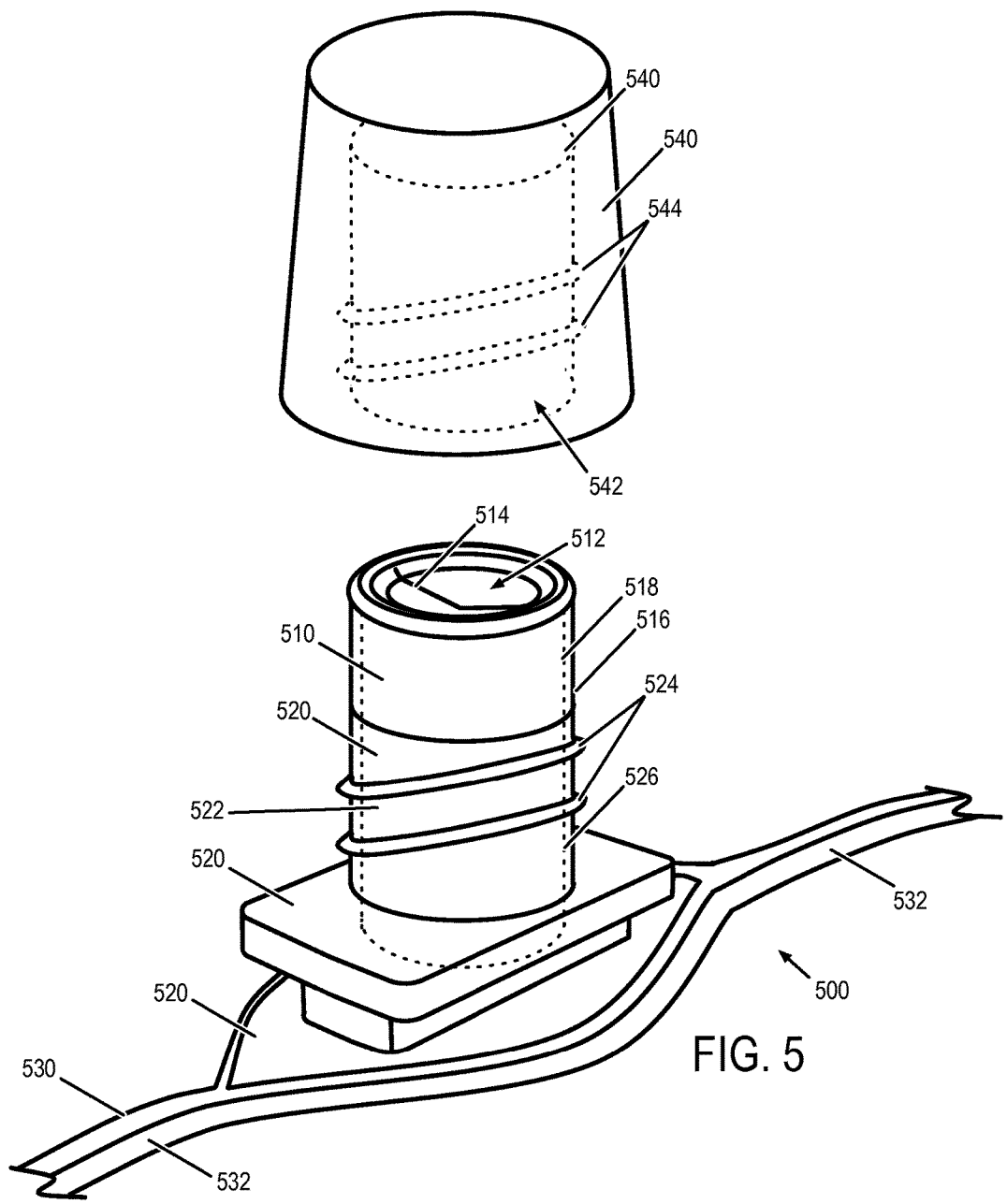
FIG. 5 depicts an example valve assembly that includes a deformable elastomeric valve

FIG. 5 depicts an example valve assembly 500 that includes a deformable elastomeric valve 510. Valve 510 is a non-limiting example of the previously described valves of FIGS. 1-4, or any other valve disclosed herein. Accordingly, elastomeric valve 510 may take the form of an elastomeric bite valve in at least some examples.

Valve 510 includes a gate assembly 512 of two gate elements that interface with each other along a gate boundary 514 of the valve. However, gate assembly 512 may include any suitable number of gates having different gate boundaries from those depicted in FIG. 5. The gate elements of gate assembly 512 separate from each other along gate boundary 514 responsive to deformation of valve 510 that results from application of an external force to the valve, thereby enabling fluid flow through an opening formed at gate boundary 514. Within the context of an elastomeric bite valve, for example, the external force may be provided by a biting action from a mouth of a user.

FIG. 5 further provides a view of valve 510 in which both ends of the valve are visible, in contrast to the views depicted in FIGS. 1-4. In this example, barrel 516 terminates along a plane that is orthogonal to an axis of a fluid pathway 518 of the valve.

Valve assembly 500 further includes a fitment 520 that defines another fluid pathway 526 that joins fluid pathway 518 of valve 510 to an internal volume of a container or to a fluid conduit. Fluid contained within the container or fluid conduit joined with fluid pathway 518 of valve 510 may be permitted to flow from the container or fluid conduit, through fluid pathways 526, 518 of the fitment and the valve, and through or across the gate assembly 514 upon application of one or more external forces to valve 100 that result in deformation of the valve.

FIG. 5 depicts a non-limiting example of a container in the form of a flexible pouch 530, which may include a single-use, disposable flexible pouch or a multi-use, refillable flexible pouch. However, other suitable containers may be used, including rigid or flexible walled containers. Within the context of a flexible pouch, flexible box, or other flexible walled container, application of external forces to the container may serve to increase fluid pressure within the container, which in-turn increases fluid pressure applied to gate assembly 512. A concave gate assembly, such as depicted in FIG. 5, may be used in this context to increase closing forces of the gate elements at gate boundary 514 as external forces are applied to the container. The concave gate assembly also enables the container to be filled with fluid through the valve after the valve and fitment are attached to the container.

In at least some examples, container 530 may form part of valve assembly 500. FIG. 5 further depicts an example of opposing walls of a flexible pouch that are heat sealed along an area 532 to join fitment 520 to the pouch. In other examples, fitment 520 may be replaced by a flexible tubing, which enables connection of the valve to a fluid container, such as a flexible hydration pack or bag.

In at least some examples, fitment 520 may be formed from a material having greater rigidity than elastomeric valve 510. As a non-limiting example, fitment 520 may be formed from a relatively hard plastic such as polypropylene, and elastomeric valve 510 may be formed from a thermoplastic elastomer (TPE), silicon rubber, or other suitable elastomer or combination of elastomers. The increase rigidity of fitment 520 may enable the container to be filled with a fluid after the fitment is attached to the container. Following filling of the container, the valve may be attached to the fitment. In at least some examples, the fitment is formed from a single or unitary piece of material, such as the previously described plastic that has a greater rigidity as compared to the elastomeric valve.

Fitment 520 may include a sleeve 522 having exterior threads 524 that accommodate corresponding interior threads 544 located within an interior region 524 of a cap 520. In at least some examples, cap 540 may form part of valve assembly 500. Interior region 522 of the cap accommodates and surrounds elastomeric valve 510 when the interior threads of the cap are threaded onto exterior threads 524 of sleeve 522. In this configuration, valve 510 is located within and surrounded by cap 540. Cap 540 may protect valve 510 from the application of external forces that may cause gate assembly 512 to open.

In at least some example, cap 540 may provide a robust seal for storage or shipment when the cap is threaded onto the sleeve. As an example, the cap may include an interior surface 546 located at a terminating end of interior region 522 that contacts a terminating end of valve 510 (e.g., at a rim of the valve or other external surfaces) when the cap is threaded onto the sleeve, thereby sealing fluid within a throat region of the valve even if the gate assembly opens. Other interior surfaces of interior region 522 (e.g., the side walls of interior region 522) may contact exterior surfaces of the valve and/or the sleeve to provide additional sealing when the cap is threaded onto the sleeve. Exterior surfaces of the cap surrounding an opening formed by interior region 522 may contact opposing external surfaces of the fitment to provide additional sealing when the cap is threaded onto the sleeve.

Figure 6:
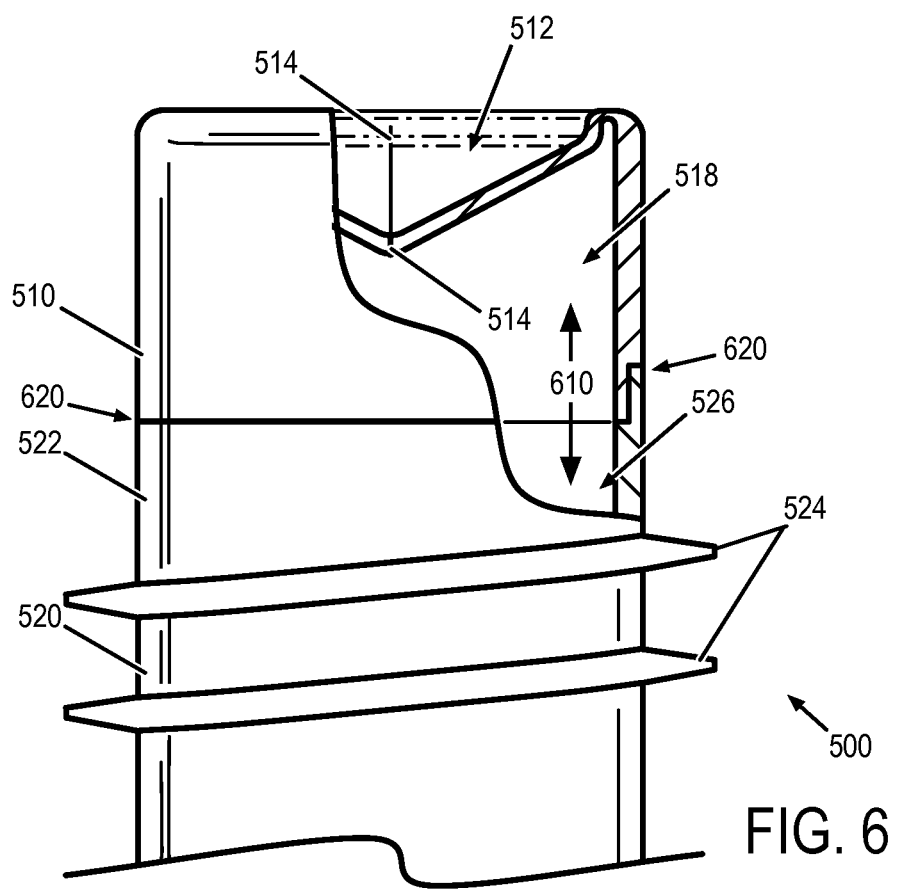
FIG. 6 depicts an internal view of the example valve assembly of FIG. 5.

FIG. 6 depicts an internal view of the example valve assembly 500 of FIG. 5. Within FIG. 6, fluid pathways 518, 526 are depicted as being connected to form a common fluid pathway 610. Also within FIG. 6, an example interface 620 between valve 510 and sleeve 522 of fitment 520 is depicted. In at least some examples, valve 510 may be attached to sleeve 522 or other object by double-shot molding, insert molding, or over molding, each of which generally refer to a process where a first material of a first object is molded onto a second material of a second object. This process results in a chemical and/or heat bond between the two materials. Increasing the surface area between the two materials also increases a strength of the bond. Surface area at interface 620 between valve 510 and sleeve 522 may be increased by a lip, rim, rib, or other suitable structure. For example, walls defining the barrel of valve 510 and the walls of sleeve 522 partially overlap with each other in FIG. 6 to increase surface area at interface 620. Additionally or alternatively, mechanical attachment may be used to secure valve 510 to another object, such as sleeve 522. Examples of mechanical attachment include a press fit between objects, such as via overlapping lip, rim, ridge, or other suitable structure of a first object that overlaps with a retaining sleeve or ring of a second object.

Figure 7B:
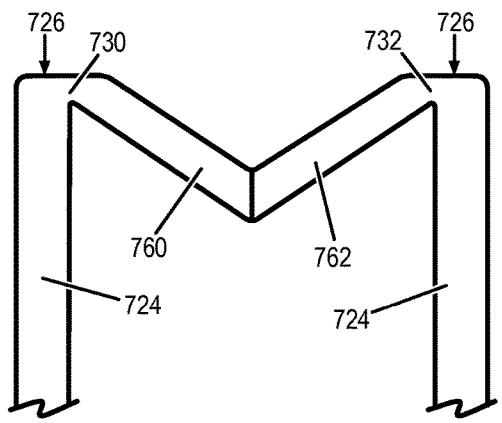
Figure 7C:
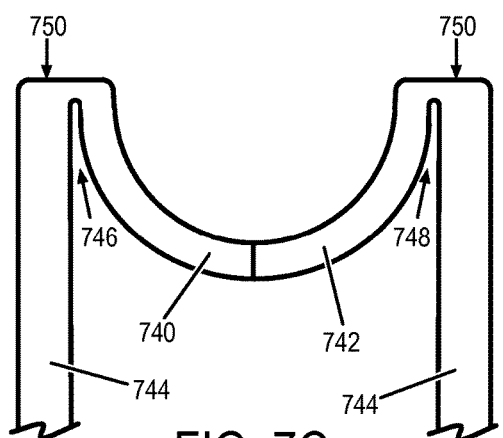
Figure 7D:
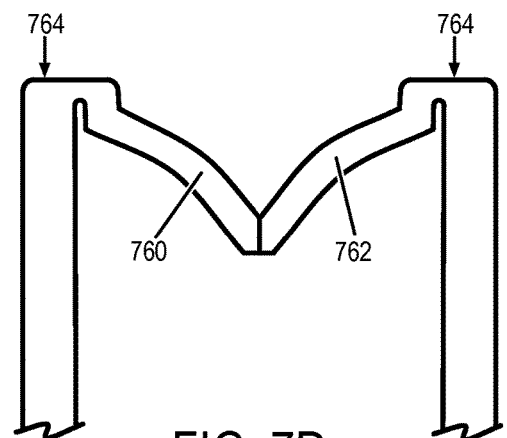
Figure 7E:
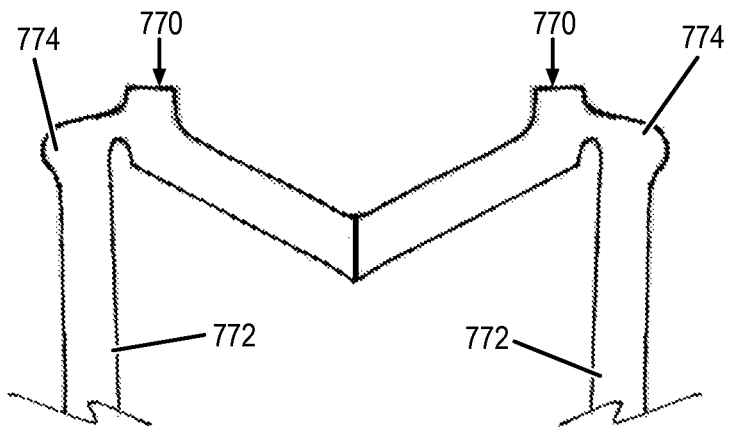
Figure 7F:
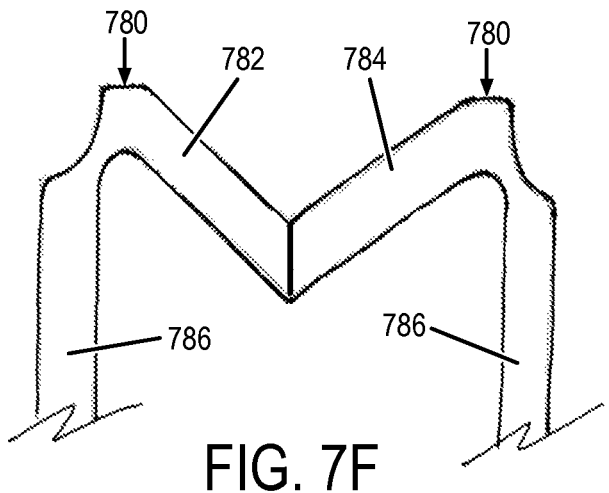
Figure 7G:
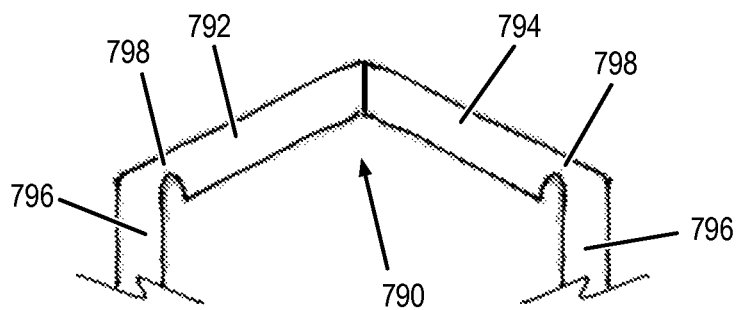

FIGS. 7A-7G depict additional examples of valves in simplified form. The valves depicted in FIGS. 7A-7G are non-limiting examples of valve 100 of FIG. 1 or any other valve disclosed herein. Each of the valves depicted in FIGS. 7A-7G are symmetric about an axis of the valve. FIGS. 7A-7G each provide a section view of a valve within a plane that bisects the valve along the axis. FIGS. 7A-7F depict examples of concave gate assemblies, whereas FIG. 7G depicts an example of a convex gate assembly.

FIG. 7A depicts an example of a valve that does not include hinges between gate elements 710, 712 and barrel 714. In this example, gate elements 710, 712 have a substantially constant thickness along their length, and are each formed by an individual segment having substantially planar surfaces in contrast to the more complex gate geometry of valve 100. Also in this example, a rim 716 of the valve is formed by the terminal end of the barrel.

FIG. 7B depicts an example of a valve that includes hinges between gate elements 720, 722 and barrel 724. In this example, gate elements 720, 722 join barrel 724 at a reduced cross-section that defines hinges 730, 732, respectively. Also in this example, a rim 726 of the valve is formed by the terminal end of the barrel and by gate elements 720, 722. Gate elements 720, 722 are again each formed by individual segments having substantially planar surfaces in contrast to the more complex gate geometry of valve 100.

FIG. 7C depicts an example of a valve that again includes hinges between gate elements 740, 742 and barrel 744. In this example, the valve includes gate clearance regions 746, 748 defined by interior surfaces of the barrel walls, the hinges, and the gate elements. Gate elements 740, 742 in this example have curved surfaces, and the individual gate elements have concave surfaces relative to a terminal end of the valve formed by rim 750. In this example, rim 750 is formed by the terminal end of the barrel and by gate elements 740, 742.

FIG. 7D depicts an example of a valve that includes individual gate elements 760, 762 having convex surfaces relative to a terminal end of the valve formed by rim 764. This example further includes gate elements that each have two segments.

FIG. 7E depicts an example of a valve that includes a barrel 772 having a variable radius or diameter. In this example, an exterior surface of the barrel walls expands outward in the radial direction from an axis of the valve as indicated at 774. Also in this example, feature 774 is located on an opposite side of the hinge from rim 770.

FIG. 7F depicts an example of a valve that includes a rim 780 that is formed from external surfaces of the gate elements 782, 784 as opposed to the barrel 786. Also in this example, portions of the valve assembly extend beyond a terminal end of the barrel as measured along the axis of the valve.

FIG. 7G depicts an example of a valve having a convex gate assembly 790. In this example, gate elements 792, 794 of the gate assembly project beyond a terminal end of the barrel 796. Also within this example, the valve includes hinges 798 between the barrel and the gate elements. While gate elements 792, 794 are depicted as having planar surfaces, in other examples, gate elements of a convex gate assembly may have curved and/or segmented gate elements, for example, as described herein with regards to concave gate assemblies.

FIGS. 8A-8D depict external views of additional examples of valves in simplified form as viewed along an axis of a fluid pathway of each valve. The valves depicted in FIGS. 8A-8D are non-limiting examples of valve 100 of FIG. 1 or any other valve disclosed herein.

Figure 8A:
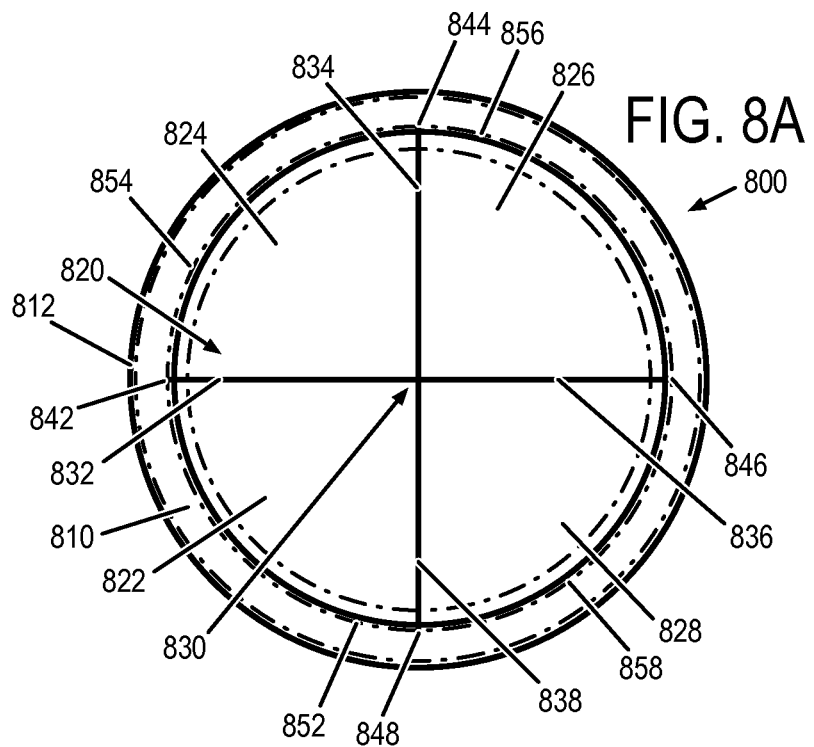
FIGS. 8A-8D depict external views of additional examples of valves in simplified form as viewed along an axis of a fluid pathway of each valve.

FIG. 8A depicts an example valve 800, as viewed along a fluid pathway of the valve. Valve 800 is another non-limiting example of the previously described valve 100 of FIG. 1, and the various other valve examples of FIGS. 5, 6, and 7. Valve 800 includes a barrel 810 having a wall 812 that defines a circular shape. Valve 800 further includes a gate assembly 820 having a circular shape formed by four gate elements 822, 824, 826, 828 that interface with each other along a set of gate boundaries 830 to collectively block a fluid pathway of barrel 810. In this example, the set of gate boundaries 830 bisect gate assembly 820 along a first axis and along a second axis that is perpendicular to the first axis. The set of gate boundaries 830 includes a first gate boundary 832 that defines an interface between gate elements 822, 824, a second gate boundary 834 that defines an interface between gate elements 824, 826, a third gate boundary 836 that defines an interface between gate elements 826, 828, and a fourth gate boundary 838 that defines an interface between gate elements 822, 828. In this example, each gate boundary terminates at an exterior terminating end (e.g., 842, 844, 846, 848) and joins the other gate boundaries at a center of gate assembly 820 that corresponds to an axis of the fluid pathway. Furthermore, in this example, each gate element has the same relative size and shape as the other gate elements of the set of gate elements 820. In at least some examples, each gate element joins barrel 810 at a reduced cross-section that forms a hinge of that gate element. In this example, the reduced cross-section has a circular shape in which hinge 852 of gate element 822 forms a first quarter-circle, hinge 854 of gate element 824 forms a second quarter-circle, hinge 856 of gate element 826 forms a third quarter-circle, and hinge 858 of gate element 828 forms a fourth quarter-circle. Gate element 822, 824, 826, 828 may rotate about their respective hinges responsive to application of an external force to barrel 810 or valve 800 generally. Also in this example, each gate boundary attains or intersects the reduced cross-section that defines hinges 852, 854, 856, 858, and each gate boundary terminates at an end point that is located at or beyond the reduced cross-section.

The example valves of FIGS. 3, 4, and 8A have circular-shaped barrels. Within the context of real-world elastomeric valves, a circular-shaped barrel may take the form of a perfect circle in a non-deformed state, or may be substantially circular in a non-deformed state. A substantially circular valve barrel may include deviation in radius from a perfect circle of within +/−1%, +/−5%, +/−10%, 15%, or other suitable deviation depending on implementation. In at least some use-scenarios, elastomeric valves that incorporate a circular-shaped barrel that is a perfect circle may have increased responsiveness and/or increased ease of opening relative to elastomeric valves that have barrels with less perfect circular shapes.

Figure 8B:
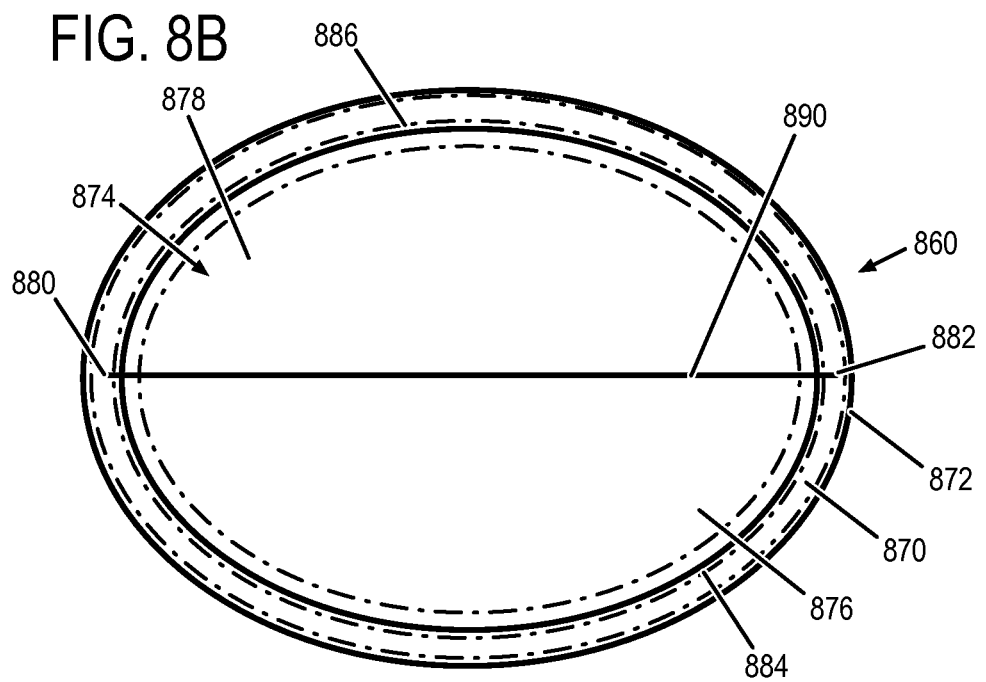

In other examples, a valve may have a non-circular shape. FIG. 8B depicts an example valve 860, as viewed along a fluid pathway of the valve. Valve 860 is another non-limiting example of previously described valve 100 of FIGS. 1, 2A, and 2B. Valve 860 includes a barrel 870 having a wall 872 that defines a non-circular shape. Valve 860 further includes a gate assembly 874 formed by two or more gate elements (e.g., gate elements 876, 878) that interface with each other along one or more gate boundaries (e.g., gate boundary 890) to collectively block a fluid pathway within barrel 870. In this example, gate boundary 890 bisects gate assembly 878 along the widest dimension of the gate assembly. In other examples, a gate boundary may bisect a non-circular gate assembly along the narrowest dimension of the gate assembly. In still other examples, a non-circular gate assembly may be formed by three or more gate elements that interface with each other along a set of two or more gate boundaries. Also in this example, gate element 876 joins barrel 870 at a reduced cross-section that forms a hinge 884 of gate element 876, and gate element 878 joins barrel 870 at a reduced cross-section that forms a hinge 886 of gate element 878. The reduced cross-section of valve 860 has a non-circular (e.g., ellipse shape) in which hinge 884 forms a first half-arc and hinge 886 forms a second half-arc of the reduced cross-section. Gate element 876, 878 rotate about their respective hinges 884, 886 responsive to application of an external force to barrel 870 or valve 860 generally. Also in this example, gate boundary 890 extends outward beyond the reduced cross-section that defines hinges 884, 886, and terminates at end points 880, 882.

Figure 8C:
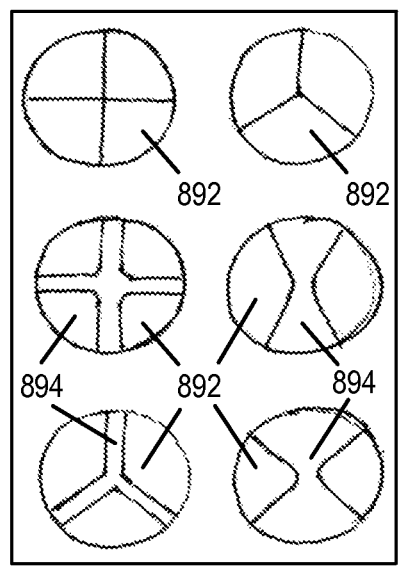

FIG. 8C depicts additional examples of valves as viewed along a fluid pathway of each valve. In FIG. 8C, example gate elements are indicated at 892. In at least some examples, gate elements may be separated from each other by a boundary structure indicated at 894 that spans at least a portion of the gate assembly. It will be understood that FIG. 8C depicts just some of the various shapes that gate elements and their complementary boundary structures may take, and that other suitable shapes may be used.

Figure 8D:
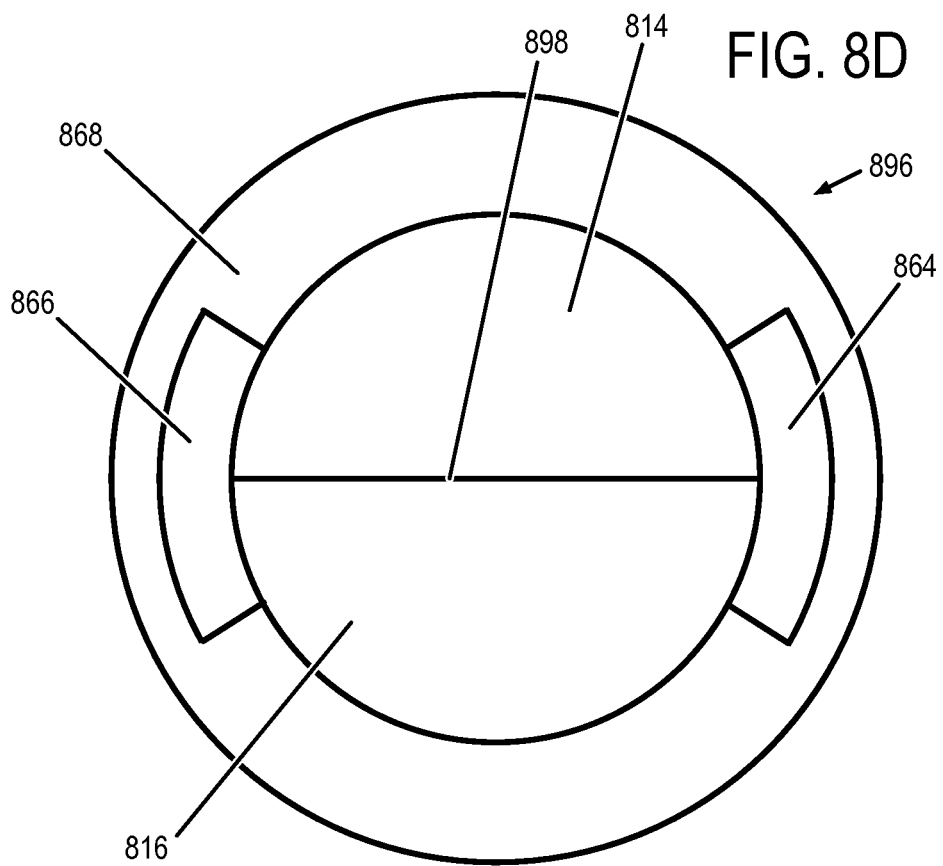

FIG. 8D depicts an example valve 896, as viewed along a fluid pathway of the valve. Valve 896 is another non-limiting example of previously described valve 100 of FIGS. 1, 2A, and 2B. Valve 896 includes a non-continuous rim formed by rim portions 864 and 866. Rim portions 864, 866 form a distal or terminating end of valve 896, and have a greater elevation as measured along an axis of the valve as compared to surrounding surface regions indicated at 868. FIG. 8D further depicts an example in which a gate boundary 898 of gate elements 814, 816 terminates at the sides of the valve that include rim portions 864 and 866. Rim portions 864 and 866 may provide additional surfaces upon which forces may be applied to open gate elements 814, 816 of valve 896.

In this example, rim portions 864, 866 take the form of arc-shaped portions as viewed along the fluid pathway. However, each rim portion may have other suitable forms when viewed along the fluid pathway including linear, circular, elliptical, polygonal, etc. In the third dimension (e.g., coming out of the page in FIG. 8D), each rim portion may have orthogonal or tapering walls that increase in elevation relative to surrounding surface regions 868 as measured along an axis of the fluid pathway. As an example, FIG. 7E depicts a section view of rim 770 located on each side of the valve's gate assembly that may be formed by rim portions, such as rim portions 864 and 866. In the example depicted in FIG. 7E, the direction of the gate boundary is orthogonal to the direction of the gate boundary in FIG. 8D.

Figure 9:
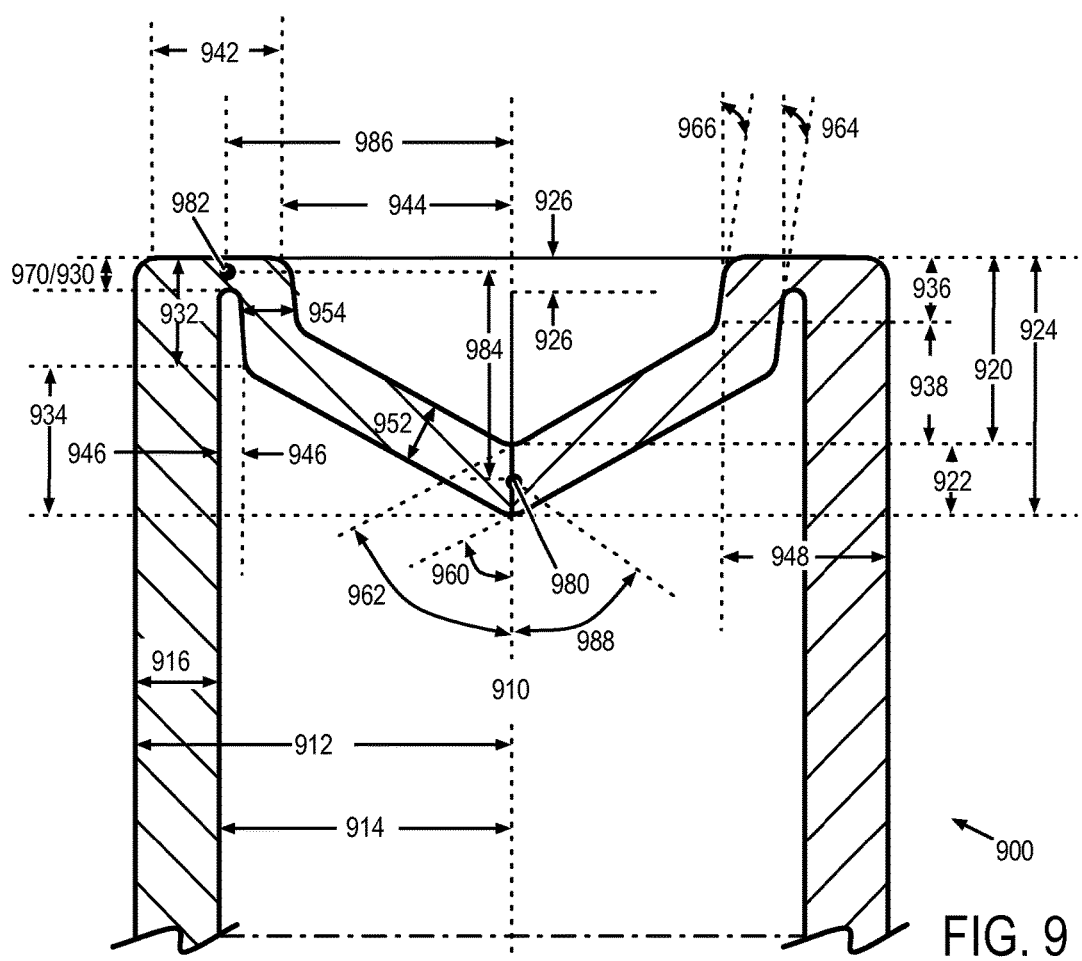
FIG. 9 depicts an internal view of an example valve with dimensioned features.

FIG. 9 depicts an internal view of an example valve 900 with dimensioned features. Valve 900 is depicted in a first state, as viewed within a plane that bisects the valve. Valve 900 may take the form of any of the valves described herein, for example, by varying a relative size of the dimensioned features.

Valve 900 is depicted in FIG. 9 as being symmetric about an axis 910 of a fluid pathway defined by a barrel of the valve, such as previously described with reference to axis 116 of FIG. 1. In at least some examples, valve 900 takes the form of a volume that is wrapped around axis 910 in which all dimensions of FIG. 9 are identical or substantially identical in each radial direction from axis 910 (with the exception of gate boundaries). In other examples, some or all of the dimensions may vary as the valve is rotated about axis 910.

Within FIG. 9, dimension 912 refers to a distance between the axis and an exterior surface of a barrel wall. Dimension 912 may be referred to as an outer radius of the barrel. In examples where the exterior surface of the barrel wall is circular, as viewed along a direction of axis 910, the outer radius of the barrel is equal in each radial direction from the axis. In other examples, the exterior surface of the barrel wall may have a non-circular shape, as viewed along a direction of axis 910. In these examples, the outer radius of the barrel differs at different radial directions from the axis.

Dimension 914 refers to a distance between the axis and an interior surface of the barrel wall. Dimension 914 may be referred to as an inner radius of the barrel. In examples where the interior surface of the barrel is circular as viewed along a direction of axis 910, the inner radius of the barrel is equal in each radial direction from the axis. In other examples, the interior surface of the barrel wall may have a non-circular shape, as viewed along a direction of axis 910. In these examples, the inner radius of the barrel differs at different radial directions from the axis.

Dimension 916 refers to a distance between the exterior surface and the interior surface of the barrel wall. Dimension 916 may be referred to as a barrel wall thickness. In some examples the barrel wall thickness is equal in each radial direction from the axis. In other examples, the barrel wall thickness may differ at different radial directions from the axis.

In at least some examples, dimensions 912, 914, and 916 defining the barrel geometry may be constant over a length of the barrel, as measured along a direction of the axis. As an example, the barrel may form an annulus having a constant width on interior, exterior, and wall thickness dimensions along the entire length of the barrel or a length portion of the barrel. In other examples, some or all of dimensions 912, 914, and/or 916 may vary over the entire length of the barrel or a length portion of the barrel, as measured along a direction of the axis. As an example, the barrel may form a tapering annulus that tapers toward or away from the gate assembly or rim of the valve. FIG. 7E depicts an example of a barrel that has a variable wall thickness and a variable radius along a direction of the axis as indicated at 774.

Dimension 920 refers to a distance between the rim of the valve and an interior surface of the gate assembly at the apex. The apex of the interior surface of the gate assembly refers to the most distal point of the gate assembly's interior surface from the rim. Dimension 920 may be referred to as a depth of the interior surface of the gate assembly relative to the rim. In this example, the apex is formed at the axis. In other examples, the apex of the interior surface of the gate assembly may be formed by an area that surrounds the axis, and the axis may be located at the center of the area. In still other examples, the apex of the interior surface of the gate assembly may be offset in a radial direction from the axis or the axis may not be located at a center of an area forming the apex.

Dimension 922 refers to a distance between the interior surface and an exterior surface of the gate assembly at the apex. Dimension 922 may be referred to as a thickness of the gate assembly. In some examples, dimension 922 may be equal to dimension 916, which refers to the barrel wall thickness. In other examples, dimension 922 may less than or greater than dimension 916. Dimensions 952 and 954 refer to a thickness of the gate assembly at other locations along a length of each gate element. For example, dimension 952 refers to a thickness of a first segment of each gate element, and dimension 954 refers to a thickness of a second segment of the each gate element. In some examples, dimensions 922, 952, and 954 may be equal to define gate elements having a constant thickness along their length. In other examples, one or more of dimensions 922, 952, and/or 954 may differ from each other to define gate elements having varying thickness along their length.

Dimension 924 refers to a distance between the rim of the valve and the exterior surface of the gate assembly at the apex. Dimension 924 may be referred to as a depth of the exterior surface of the gate assembly relative to the rim. In this example, the apex of the interior surface of the gate assembly is again formed at the axis. In other examples, the apex of the interior surface of the gate assembly may be formed by an area that surrounds the axis, and the axis may be located at the center of the area. In still other examples, the apex of the interior surface of the gate assembly may be offset in a radial direction from the axis or the axis may not be located at a center of an area forming the apex.

Dimension 930 refers to a distance across the narrowest cross-section that defines a hinge between each gate element and a wall of the barrel. In some examples, hinges may be omitted from the valve, and dimension 930 may be equal to the barrel wall thickness indicated by dimension 916 and/or a thickness of the gate elements indicated by dimensions 922, 952, and 954. Dimension 970 refers to a distance, as measured along a direction of the axis, from the rim to the most distal point of the hinge from the rim. In the example depicted in FIG. 9, dimensions 930 and 970 refer to the same distance, since the narrowest cross-section that defines hinge is parallel to the axis. However, in other examples, the hinge may have other orientations, and dimension 970 may be less than or greater than dimension 930, depending on configuration.

Dimension 926 refers to a distance between the rim and each end point of the one or more boundaries between gate elements of the gate assembly. In some examples, dimension 926 may be equal for each boundary of each gate element. In the example depicted in FIG. 9, dimension 926 is greater than dimension 970, which defines a configuration where the boundaries of the gate elements do not reach the hinges. In other examples, dimension 926 may be equal to or less than dimension 970, which defines a configuration where the boundaries of the gate elements reach or pass through the hinges.

Dimension 932 refers to a distance between the rim of the valve and a transition of the second segment of each gate element to the first segment along the interior surface of that gate element. In the example depicted in FIG. 9, the interior surface of the second segment of the gate element has a planar surface portion that transitions to the first segment of the gate element. Dimension 934 refers to a distance between an apex of the interior surface of the gate assembly and the transition of the second segment to the first segment along the interior surface of each gate element. The sum of dimensions 932 and 934 is equal to dimension 920. In the example depicted in FIG. 9, dimension 932 is less than dimension 934. In other examples, dimension 932 may be greater than or equal to dimension 934. In still further examples, dimension 932 may be zero, such as where each gate element includes a single segment or where each gate element is formed by a continuous curve.

Dimension 936 refers to a distance between the rim of the valve and a transition of the second segment of each gate element to the first segment along the exterior surface of that gate element. In the example depicted in FIG. 9, the exterior surface of the second segment of the gate element has a planar surface portion that transitions to the first segment of the gate element. Dimension 938 refers to a distance between an apex of the exterior surface of the gate assembly and the transition of the second segment to the first segment along the exterior surface of each gate element. The sum of dimensions 936 and 938 is equal to dimension 920. In the example depicted in FIG. 9, dimension 936 is less than dimension 938. In other examples, dimension 936 may be greater than or equal to dimension 938. In still further examples, dimension 936 may be zero, such as where each gate element includes a single segment or where each gate element is formed by a continuous curve that joins the rim.

Dimension 942 refers to a width of the rim, which forms the distal or terminating end of the valve as measured along a direction of axis 910. In FIG. 9, dimension 942 extends to a transition of the rim located at or near the exterior surface of the barrel and a transition of the rim at or near the exterior surface of the gate assembly. The example depicted in FIG. 9 includes rounded transitions at inner and outer edges of the rim. In other examples, one or more of these transitions at the inner and/or outer edges of the rim may have a rectilinear or non-rounded shape.

Dimension 944 refers to a distance between axis 910 and the rim. Dimension 944 may be referred to as a radius of the throat or throat region of the valve or gate assembly. In at least some examples, dimension 944 may be the same or substantially the same in each radial direction of the valve from axis 910, such as depicted in FIG. 3. In other examples dimension 944 may vary in different radial directions from axis 910, such as depicted in FIG. 8B, for example.

Dimension 946 refers to a distance between an interior surface of the barrel wall and an interior surface of the first segment of the gate assembly that defines a clearance region. In examples where the clearance region is defined by an interior surface of the gate assembly that is parallel to an interior surface of the barrel, dimension 946 may be constant over a length of the clearance region as measured in a direction that is parallel to axis 910. Dimension 946 may vary over this length in examples where interior surfaces of the barrel and gate assembly are not parallel to each other.

Dimension 948 refers to a distance between an exterior surface of the barrel and an exterior surface of the gate assembly. For a gate assembly that forms a tapering volume, dimension 948 varies along at least a portion of the depth of the gate assembly. In the example depicted in FIG. 9, dimension 948 is at its greatest at the transition between the rim and the exterior surface of the gate assembly that defines the throat of the valve.

Dimension 960 refers to an angle between the axis and a planar portion of the interior surface of the first segment of each gate element of the gate assembly. In other examples, the interior surface of the first segment of each gate element may be curved and may not include a planar portion. Dimension 962 refers to an angle between the axis and a planar portion of the exterior surface of the second segment of each gate element of the gate assembly. In other examples, the exterior surface of the second segment of each gate element may be curved and may not include a planar portion.

Dimension 964 refers to an angle between the axis and a planar portion of the interior surface of the first segment of each gate element of the gate assembly. In other examples, the interior surface of the first segment of each gate element may be curved and may not include a planar portion. Dimension 966 refers to an angle between the axis and a planar portion of the exterior surface of the first segment of each gate element of the gate assembly. In other examples, the exterior surface of the first segment of each gate element may be curved and may not include a planar portion.

Dimension 984 refers to a distance between points 980 and 982 as measured along a direction that is parallel to axis 910. Dimension 984 may be referred to as a depth dimension of the gate assembly or an individual gate element. Dimension 986 refers to a distance between points 980 and 982 as measured along a direction that is orthogonal to axis 910. Dimension 986 may be referred to as a radial dimension of the gate assembly or an individual gate element. Point 980 is located at a midpoint between interior and exterior surfaces of the gate assembly along the gate boundary. Point 982 is located at a midpoint between interior and exterior surfaces of the hinge that joins the gate assembly to the barrel of the valve. In examples in which a valve does not include hinges, point 982 may refer to a midpoint between an interior surface and an exterior surface of the valve at an interface of the gate element and the barrel.

In an example, a ratio of dimension 984 to dimension 986 is 0.20 or greater in each radial direction from axis 910. In another example, a ratio of dimension 984 to dimension 986 is 0.25 or greater in each radial direction from axis 910. In yet another example, a ratio of dimension 984 to dimension 986 is between 0.25 and 0.30 in each radial direction from axis 910. In yet another example, a ratio of dimension 984 to 986 is between 0.25 and 1.0 in each radial direction from axis 910. As previously discussed, the responsiveness and/or ease of opening of deformable elastomeric valves may be improved by increasing a depth of the valve's gate elements along the axis of the valve.

Dimension 988 refers to an effective angle between an axis 910 and a line that passes through points 980 and 982. The effective angle provides a measure of the gate assembly that is independent of the shape of the individual gate elements. In at least some examples, the effective angle may be equal to or less than 45 degrees and greater than or equal to 70 degrees in each radial direction from axis 910. However, other suitable angles may be used. While points 980 and 982 are described with reference to a midpoint of the valve material between two surfaces, alternative reference point locations may be used for dimensioning that are instead located on an interior surface of the valve material directly below points 980, 982 (i.e., in a direction parallel to the axis), or instead located on an exterior surface of the valve material directly above points 980, 982 (i.e., in a direction parallel to the axis). In the case of these alternative reference point locations, the relative ratios and angles disclosed herein may remain the same in at least some configurations of the valve, or may different in other configurations of the valve.

Figure 10:
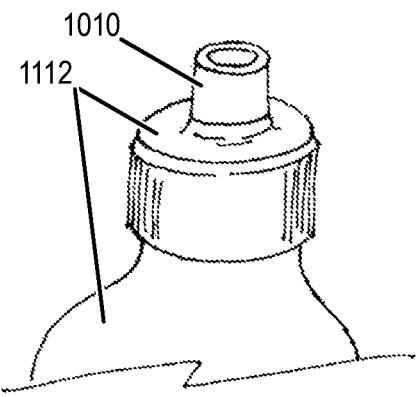
FIG. 10 depicts an example of an elastomeric valve implemented on a bottle.

FIG. 10 depicts an example of an elastomeric valve 1010 implemented on a bottle 1012. The elastomeric valve of FIG. 10 may take the form of any of the valves described herein. The bottle in FIG. 10 may take the form of a disposable bottle or a non-disposable bottle. The bottle may be formed from a more rigid plastic than the valve, for example, as previously described with reference to the fitment of FIGS. 5 and 6. As an example, double-shot molding may be used to join the valve to the bottle to form a valve assembly. The valve assembly may further include a plastic cover that surrounds, covers, seals, and keeps the valve clean during shipment and storage. The bottle in this example, the bottle may not include an air return valve or opening if the bottle takes the form of a deformable squeeze bottle. For example, a consumer can squeeze the bottle while drinking from the valve, and when finished the bottle returns to it's original shape as air sucked back into the bottle through the valve.

Figure 11:
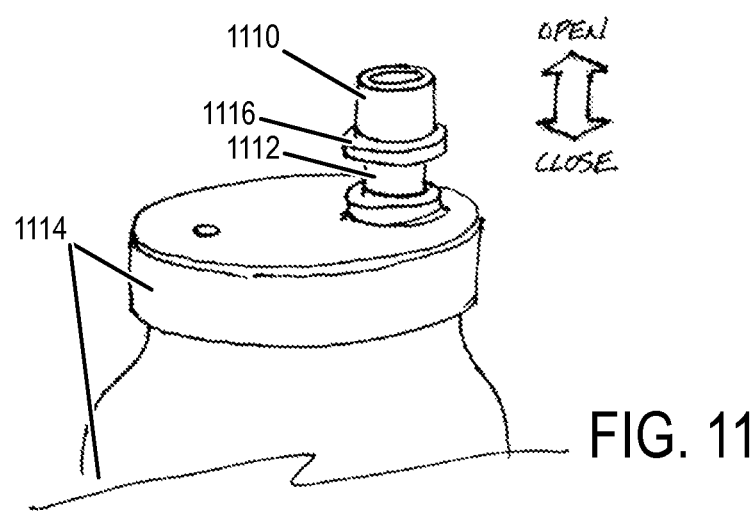
FIG. 11 depicts an example of an elastomeric valve implemented on a push/pull stem.

FIG. 11 depicts an example of an elastomeric valve 1110 implemented on push/pull stem 1112 of a container 1114. The elastomeric valve of FIG. 11 may take the form of any of the valves described herein. Stem 1112 may include a fitting 1116 that slides up and down on the stem to provide a push/pull action that closes and opens the valve. The stem and fitting may be formed from a more rigid plastic than the valve, for example, as previously described with reference to the fitment of FIGS. 5 and 6. As an example, double-shot molding may be used to join the valve to the fitting. Also in this example, the container includes an air return valve 1118. In alternative configurations, the container may include valve 1110 integrated with a mouthpiece (e.g., as depicted in FIG. 12) that is press fit on top of a rotatable spout that seals in a downward rotated position and opens when flipped to an upward rotated position.

Figure 12:
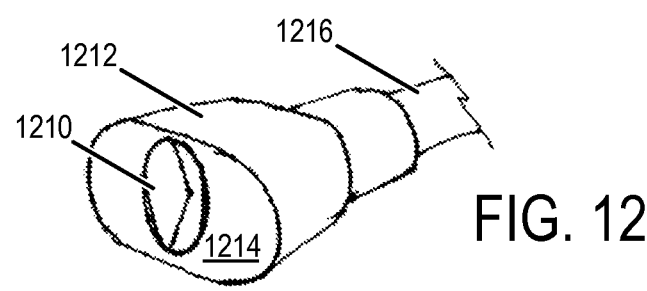
FIG. 12 depicts an example of an elastomeric valve integrated with a mouthpiece.

FIG. 12 depicts an example of an elastomeric valve 1210 integrated with a mouthpiece 1212. Valve 1210 Mouthpiece 1212 may take the form of an elongated mouthpiece (i.e., non-symmetric in a radial direction relative to an axis of the valve) in some examples to help the user determine the orientation of the valve. In this example, the mouth piece is elongated, but the valve remains round or substantially round to provide enhanced performance, as previously described. In the example depicted in FIG. 12, a rim of the valve takes the form of a front face 1214 of mouthpiece 1212. In other examples, a rim of the valve may be raised relative to a surface of front face 1214. In at least some examples, mouthpiece 1212 is formed from an individual or unitary piece of elastomeric material that includes valve 1210. Mouthpiece 1212 may be joined to tubing 1216 that is connected to a hydration pack in this example. In other examples, mouthpiece may be joined to a bottle, pouch, box, or other fluid container using any of the techniques described herein.

The drawings accompanying this disclosure include schematic representations of example valve geometries and example valve assembly geometries. These drawings are not necessarily to scale. The various examples disclosed herein include features that may be used individually or in any combination. Claimed subject matter is not limited to the combination of features disclosed by an individual example, since features that are present in two or more of the disclosed examples may be used together in any suitable combination. Accordingly, it should be understood that the disclosed examples are illustrative and not restrictive. Variations to the disclosed examples that fall within the metes and bounds of the claims or equivalence of such metes and bounds are intended to be embraced by the claims.

The invention claimed is:

1. A deformable elastomeric bite valve, comprising:
a barrel having one or more walls defining a fluid pathway, the barrel deformable between a non-deformed state and a deformed state; and
a gate assembly having two or more gate elements forming a tapering volume that projects into the fluid pathway from the one or more walls of the barrel, the tapering volume of the gate assembly being concave relative to a terminal end of the valve,
the two or more gate elements interfacing with each other along one or more gate boundaries to collectively block the fluid pathway in the non-deformed state and separating from each other along the one or more gate boundaries and away from the terminal end of the valve in the deformed state to permit fluid flow through the gate assembly, and
each gate element of the two or more gate elements having a ratio of a depth dimension to a radial dimension of 0.20 or greater in the non-deformed state, the depth dimension measured along an axial direction parallel to an axis of the fluid pathway and the radial dimension measured along a radial direction orthogonal to the axis of the fluid pathway,
each gate element of the two or more gate elements joining the barrel at a reduced cross-section that forms a hinge of that gate element in which each hinge has an arc shape as viewed along the axis of the fluid pathway.

2. The valve of claim 1, wherein the gate assembly has two gate elements that interface with each other along a single gate boundary in the non-deformed state.

3. The valve of claim 1, wherein each reduced cross-section has an exterior surface that forms a portion of a rim that defines the terminal end of the valve and an interior surface that further defines a portion of the fluid pathway.

4. The valve of claim 1, wherein each gate element has a first segment and a second segment, wherein the first segment is inclined relative to the axis of the fluid pathway by a greater amount than the second segment at least in the non-deformed state; and
wherein the one or more gate boundaries extend radially outward from an apex of the gate assembly along the first segment and along at least part of the second segment of each gate element.

5. The valve of claim 4, wherein the second segment of each gate element is parallel to the axis of the fluid pathway in the non-deformed state.

6. The valve of claim 1, wherein the tapering volume is surrounded by the one or more walls of the barrel.

7. The valve of claim 1, wherein the barrel has a circular shape as viewed along the axis of the fluid pathway.

8. The valve of claim 1, wherein the barrel has a non-circular oval shape as viewed along the axis of the fluid pathway.

9. The valve of claim 1, wherein the hinges collectively form a circle or a non-circular oval that surrounds the axis of the fluid pathway.

10. A deformable elastomeric bite valve, comprising:
a barrel having one or more walls defining a fluid pathway, the barrel deformable between a non-deformed state and a deformed state; and
a gate assembly having two or more gate elements forming a tapering volume that projects into the fluid pathway from the one or more walls of the barrel and is concave relative to a terminal end of the valve,
the two or more gate elements interfacing with each other along one or more gate boundaries to collectively block the fluid pathway in the non-deformed state and separating from each other along the one or more gate boundaries and away from the terminal end of the valve in the deformed state to permit fluid flow through the gate assembly,
each gate element of the two or more gate elements joining the barrel at a reduced cross-section that forms a hinge of that gate element in which each hinge has an arc shape as viewed along an axis of the fluid pathway,
each reduced cross-section having an exterior surface that forms a portion of a rim that defines the terminal end of the valve and an interior surface that further defines a portion of the fluid pathway.

11. The valve of claim 10, wherein the gate assembly has two gate elements that interface with each other along a single gate boundary in the non-deformed state.

12. The valve of claim 10, wherein each gate element has a first segment and a second segment, wherein the first segment is inclined relative to the axis of the fluid pathway by a greater amount than the second segment at least in the non-deformed state; and
wherein the one or more gate boundaries extend radially outward from an apex of the gate assembly along the first segment and along at least part of the second segment of each gate element.

13. The valve of claim 10, wherein the tapering volume is surrounded by the one or more walls of the barrel.

14. The valve of claim 10, wherein the barrel has a circular shape as viewed along the axis of the fluid pathway.

15. The valve of claim 10, wherein the barrel has a non-circular oval shape as viewed along the axis of the fluid pathway.

16. The valve of claim 10, wherein the hinges collectively form a circle or a non-circular oval that surrounds the axis of the fluid pathway.

17. A deformable elastomeric bite valve, comprising:
a barrel having one or more walls defining a fluid pathway, the barrel deformable between a non-deformed state and a deformed state; and a gate assembly having two gate elements forming a tapering volume that projects into the fluid pathway from the one or more walls of the barrel,
 the tapering volume of the gate assembly being concave relative to a terminal end of the valve in which the tapering volume is surrounded by the one or more walls of the barrel,
 the two gate elements interfacing with each other along a gate boundary to collectively block the fluid pathway in the non-deformed state and separating from each other along the one or more gate boundaries and away from the terminal end of the valve in the deformed state to permit fluid flow through the gate assembly,
 each gate element of the two gate elements joining the barrel at a reduced cross-section that forms a hinge of that gate element in which each hinge has an arc shape as viewed along an axis of the fluid pathway, and
the gate boundary intersecting the reduced cross-section on two opposing sides of the barrel.

18. The valve of claim 17, wherein the hinges collectively form a circle or a non-circular oval that surrounds the axis of the fluid pathway.

* * * * *